United States Patent

Aono

[11] 4,076,105
[45] Feb. 28, 1978

[54] LEVER STRAP FOR A DRUM BRAKE

[75] Inventor: Masami Aono, Yokohama, Japan

[73] Assignee: Tokico Ltd., Kawasaki, Japan

[21] Appl. No.: 733,307

[22] Filed: Oct. 18, 1976

[30] Foreign Application Priority Data

Oct. 20, 1975   Japan ........................... 50-142740[U]

[51] Int. Cl.² ............................................. F16D 65/22
[52] U.S. Cl. ........................ 188/106 A; 188/79.5 R;
403/197; 403/238; 403/349
[58] Field of Search ................... 188/79.5 R, 79.5 GT,
188/79.5 P, 79.5 SC, 79.5 SS, 106 A, 325, 327,
328; 403/349, 238, 197

[56] References Cited

U.S. PATENT DOCUMENTS

| 867,162 | 9/1907 | Seidl | 403/349 |
| 3,666,058 | 5/1972 | Quincey | 188/79.5 R |

FOREIGN PATENT DOCUMENTS

| 456,477 | 5/1949 | Canada | 188/79.5 SS |
| 972,248 | 1/1951 | France | 403/349 |

Primary Examiner—Trygve M. Blix
Assistant Examiner—Edward R. Kazenske

Attorney, Agent, or Firm—Schmidt, Johnson, Hovey & Williams

[57] ABSTRACT

An improved and reusable stop assembly is provided for employment in drum brakes of the type having an internal lever operably coupled with the brake shoes for actuating the brake from a standby, partially retracted, relative position of the brake shoes to a position in which the shoes are spread apart to apply braking forces to the drum. The improved stop assembly includes a guide sleeve part mounted on the backing plate of the brake and a freely slideable and removable stop member receivable therewithin. When the stop member is inserted into and locked within the sleeve assembly, its inner end engages the lever to hold the shoes in their standby, partially retracted, relative positions against the forces of yieldably biasing means conventionally coupled with the shoes. The stop member may be released from the sleeve assembly by a simple manual rotation and withdrawal thereof to permit the shoes to shift into a fully retracted relative position facilitating maintenance operations, after which the stop member, which is reusable, may be reinserted into the sleeve assembly and relocked in position to hold the shoes in their standby, partially retracted, relative position by a simple manual reinsertion and rotation of the stop member.

4 Claims, 5 Drawing Figures

LEVER STRAP FOR A DRUM BRAKE

BACKGROUND OF THE INVENTION

This invention relates to an internal expansion-type drum brake and more particularly, to a drum brake of the type which comprises a rotary brake drum, a pair of arcuate brake shoes carrying friction linings thereon for engaging the inner surface of said drum and pivoted to a stationary backing plate, a mechanical actuator positioned between one end of said brake shoes to pivot the brake shoes away from each other so as to cause the friction linings to engage the inner surface of the drum to thereby brake the drum when said actuator is operated, a rockable lever having one end connected to one of said brake shoes and the other end connected to a mechanical operation means such as non-extensible flexible cable and the like and an automatic friction lining wear compensation means acting between an intermediate position between the opposite ends of said lever and the other brake shoe to automatically adjust the clearance between the drum and brake shoes.

In the drum brake of the type referred to hereinabove, it is necessary to remove the drum to replace the brake shoe or shoes when the friction lining on at least one of the brake shoes is badly worn. However, frequently the shoe or shoes do not retract from the drum for the reason that the automatic brake clearance adjusting means is present or the adjusting means is not accessible from outside whereby the removal of the drum is made difficult.

In order to eliminate this problem, a drum brake has been proposed in which a lever cooperates with a stop member (a lever retraction limit member) adapted to determine the brake clearance between the brake drum and brake shoes and is held by the stop member in a predetermined first position on this side of and spaced from the fully retracted position and the stop member is operated from outside to move the lever from said first position to said fully retracted position whereby the brake clearance can be increased and the removal of the drum is made easy.

For better understanding of the features of the present invention, reference will be made first to FIGS. 1 and 2 of the accompanying drawings which show a conventional drum brake. When the conventional drum brake is applied under normal conditions, a hydraulically operated cylinder-piston assembly 5 is operated under liquid pressure supplied from a brake liquid source (not shown) and acts on one end face of each of a pair of arcuate brake shoes 1, 2 pivoted to a backing plate 4 so as to pivot the brake shoes away from each other to cause the linings on the shoes to engage the drum, and an abutment 6 secured to the backing plate 4 is abutted by the other end face of the brake shoes 1, 2 to receive the torque applied to the brake shoes.

When the drum brake is in its non-operative position, the brake shoes 1, 2 are maintained in their disengaging position with respect to the drum by return springs 7, 8 which extend between and are anchored to the webs of the brake shoes 1, 2.

The drum brake is also operated as an emergency or parking brake by a mechanical actuator. The mechanical actuator has a lever 9 having one end pivoted to the web of the trailing brake shoe 1 by means of a pivot pin 10 in a position adjacent to the cylinder-piston assembly 5 which serves as the hydraulic actuator. The other or free end of the lever 9 is connected to one end of a non-extensible and flexible cable 11 the other end of which extends through an opening 12 in the backing plate 4 into the brake. The lever 9 acts in an intermediate position between the opposite ends thereof on one end of a strut 13 the other end of which engages the web of the leading brake shoe 2. The opposite ends of the strut 13 are bifurcated as shown by 15 to engage the lever 9 and a groove 16 in the leading brake shoe 2, respectively.

The lever 9 is normally held in a position on this side of and spaced from its fully retracted position by means of a deformable stop member 17 formed of synthetic resin and extending through an opening 18 in the backing plate 4 into the brake. The inner end of the stop member 17 engages an edge of an abutment 19 which is integrally formed with the lever 9 and is disposed at right angles to the plane of the lever 9. The abutment 19 abuts against the inner surface of a boss 20 at the free end of the flexible cable 11.

With the stop member 17 mounted on the brake, the leading end face of the stop member engages the abutment 19 to position the lever 9 in a first partially retracted position offset inwardly from its fully retracted position against the force of the return springs 7, 8.

When it is desired to remove the drum from the brake, the stop member 17 is first taken out of the backing plate 4 whereby the lever 9 is allowed to pivot freely about the pivot pin 10 outwardly to the fully retracted position under the action of the springs 7, 8 and thus, the clearance between the drum and friction linings 3 on the brake shoes 1, 2 is increased. The construction and arrangement of the conventional drum brake is as mentioned hereinabove.

That is, in the conventional internal expansion-type drum brake in which the pair of arcuate brake shoes 1, 2 carrying the friction linings 3, 3 thereon for engaging the rotary drum are pivoted to the stationary backing plate 4 and adapted to be separated at one end from each other, when the brake is operated by the mechanical actuator connection including the angularly movable lever 9 one end of which is pivoted to the trailing brake shoe 1 and the other end of which is connected to the brake operation means such as the non-extensible flexible cable 11, the strut 13 is provided to act between an intermediate position between the opposite ends of the lever 9 and the leading shoe 2 and an automatic clearance adjusting mechanism 14 is provided to automatically adjust the clearance between the brake drum and brake shoes 1, 2 in order to compensate for the wear of the friction linings 3, 3 on the brake shoes, characterized in that the lever retraction limit stop member 17 is mounted on the backing plate 4 to engage the lever 9 so as to determine the clearance between the drum and shoes when the brake is in its non-operative position, the engaging between the stop member 17 and lever 9 serves to normally hold the lever in the first partially retracted position offset inwardly from the fully retracted position, and the lever retraction limit stop member 17 is adapted to be manipulated from outside of the brake to allow the lever 9 to move from the first retracted position to the fully retracted position to thereby increase the clearance between the drum and shoes.

Thus, the conventional drum brake referred to hereinabove has succeeded in simplifying the removal of the rotary drum from the brake. In the conventional drum removal means, the stop member 17 is of an integral construction formed of any suitable deformable synthetic resin and in consequence, in order to secure the stop member to the backing plate 4 in a stabilized condition, the stop member has to be necessarily formed with a wide margin for fastening or formed in a large size. Therefore, such conventional drum removal means has the disadvantages that the stop member 17 can not be easily incorporated into the backing plate 4 and that, once removed from the backing plate 4, the stop member can not be used again because of deformation and/or breakage of the stop member or the margin of the opening to which the stop member is fastened during the removal operation of the stop member.

SUMMARY OF THE INVENTION

Therefore, the purpose of the present invention is to provide a drum brake which eliminates the disadvantages inherent in the conventional drum brake referred to hereinabove and which makes the mounting of the stop member easy and makes the stop member reusable.

The above and other objects and attendant advantages of the present invention will be more readily apparent to those skilled in the art from a reading of the following detailed description in conjunction with the accompanying drawings which show preferred embodiments of the invention for illustration purpose only, but not for limiting the scope of the same in any way.

PREFERRED EMBODIMENTS OF THE INVENTION

Figure 3:
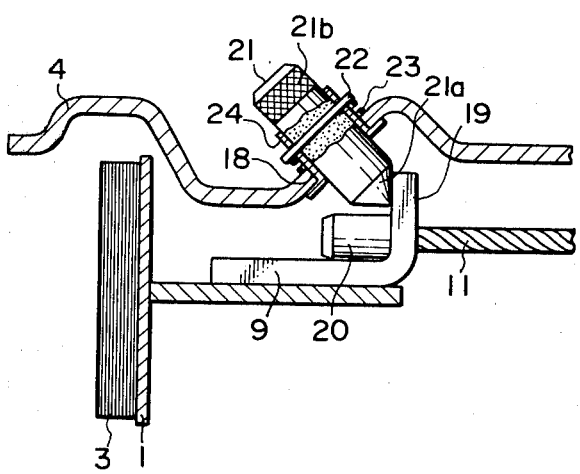
FIG. 3 is a cross-sectional view on an enlarged scale of a portion of a first embodiment of the improved drum brake of the invention which substantially corresponds to the portion as shown in FIG. 2.
Figure 4:
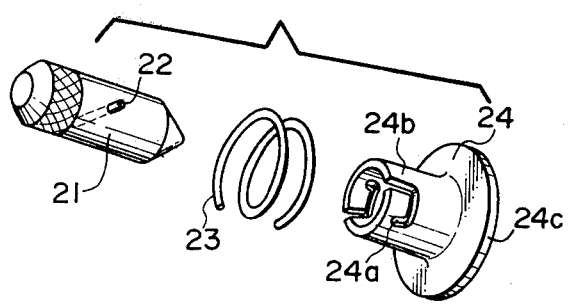
FIG. 4 is a fragmentary exploded view of the plug member of the drum brake of the invention as shown in FIG. 3.
Figure 5:
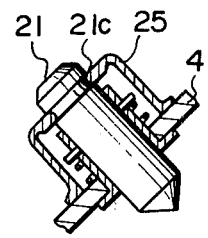
FIG. 5 is a fragmentary view in partial cross-section of a modified plug member of the invention.

The present invention will be now described referring to FIGS. 3 through 5.

Figure 1:
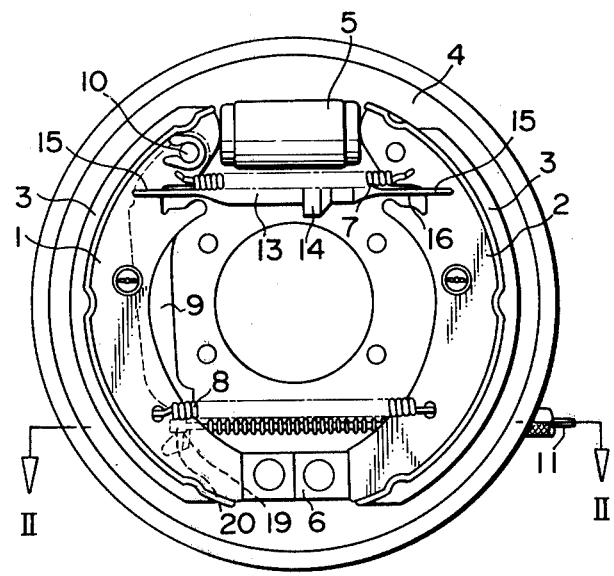
FIG. 1 is a plan view of a conventional drum brake.
Figure 2:
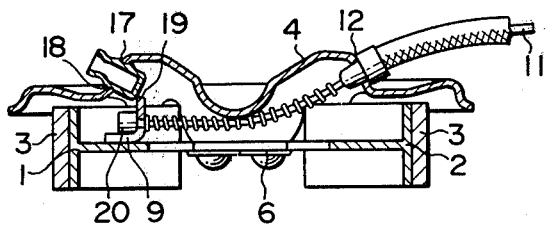
FIG. 2 is a cross-sectional view taken along substantially the line 2 — 2 of FIG. 1.

The present invention contemplates to eliminate the disadvantages inherent in the conventional drum brake by improving only the stop member 17 as shown in FIGS. 1 and 2. Thus, the parts which are similar to the parts of the conventional drum brake of FIGS. 1 and 2 in construction and operation are assigned the same numerals as those used for corresponding parts of the conventional drum brake.

As is more clearly shown in FIG. 4, according to the present invention, the stop member 17 comprises a plug 21, a coiled spring 23 and a housing 24. The plug 21 has a conical lever stop face 21a at one end, a pin or projection 22 extending through the plug body in the diametrical direction of the body in a substantially center portion of the length of the body and a knurled anti-slip face 21b at the other end. The housing 24 includes a hollow cylindrical portion 24b and a flange 24c at one end. The outer diameter of the cylindrical portion 24b substantially corresponds to the diameter of the opening 18 in the braking plate 4 and the inner diameter of the cylindrical portion 24b substantially corresponds to the diameter of the plug 21.

The cylindrical portion 24b of the housing 24 is formed with two diametrically opposite substantially J-shaped slits 24a in the opposite sides of the cylindrical portion 24b extending from the end of the cylindrical portion remote from the flanged end 24c toward the flanged end.

And as shown in FIG. 3, when mounted, the housing 24 extends through the thickness of the backing plate 4 from the inner side to the outer side of the backing plate with the flange 24c abutting against the inner side of the backing plate 4. The housing 24 is preferably closely fitted in the opening 18 in the backing plate 4. The coiled spring 23 is disposed about the cylindrical portion 24b of the housing 24 with one end of the spring anchored to the outer side of the backing plate 4. The plug 21 is received within the cylindrical portion 24b of the housing 24. When received within the cylindrical portion 24b, the opposite ends of the pin 22 are guided in the respectively associated J-shaped slits 24a and engage the turn at the outer end of the coiled spring 23 to compress the spring. The plug 21 is inserted into the cylindrical portion 24b of the housing 24 and the pin 22 is guided along the slits 24a until the pin reaches the distal ends of the slits to thereby compress the spring 23 fully. After the coiled spring 23 has been fully compressed, the plug 21 is turned within the housing 24 by means of the knurled end 21 whereby the pin 22 can be resiliently held within the distal ends of the slits 24a.

In this way, the plug 21 can be quite easily mounted on the backing plate 4. Once mounted in a predetermined position on the backing plate 4, the plug 21 performs the same function as done by the conventional stop member 17 referred to hereinabove. In this embodiment, although the lever stop end face 21a is formed as a conical shape, such a shape of the lever stop end face 21a is to maintain the stop position of the lever 9 and plug 21 in a predetermined position and in the present invention, the shape of the lever end face is not limited to the illustrated conical shape.

When the plug 21 is desired to be removed to increase the brake clearance, it is clear that the plug 21 can be easily removed by reversing the procedure described in connection with the mounting of the plug 21 on the backing plate 4.

In order to prevent the spring 23 from springing out of the housing 23 and/or prevent the housing 24 from coming out of the opening 18 in the backing plate 4 while the plug 21 is being removed from the backing plate 4 as necessary, a set bolt or other suitable means can be provided at the open ends of the slits 24a.

FIG. 5 shows a modified embodiment of the invention and in this embodiment, the plug 21 is formed adjacent to the knurled end 21 thereof with an annular groove 21c and a dust cover 25 is provided with one end received in the groove and the other end abutting against the backing plate 4 whereby invasion of water, dust or the like from outside of the backing plate 4 into the body of the brake can be effectively prevented.

According to the present invention, the plug 21 and housing 24 can be formed of any suitable synthetic resin or metal.

By the use of the present invention, the plug 21 can be easily positioned and after removal, the plug can be used again and excellent effects which could not be attained by the conventional drum brake can be obtained by quite simple means.

While only two embodiments of the invention have been shown and described in detail it will be understood that the same are for illustration purpose only and not to be taken as a definition of the invention, reference being had for this purpose to the appended claims.

What is claimed is:

1. In a drum brake of the type having
   a rotatable drum to be braked;
   a non-rotatable backing plate;
   a pair of concavely opposed, arcuate brake shoes shiftably mounted upon said backing plate and carrying friction linings thereon within said drum disposed for brakingly engaging the latter when said shoes are shifted outwardly away from each other;
   means for yieldably biasing said shoes toward each other;
   first brake force applying means operably coupled with one extremity of each of said shoes for moving said one extremities and thereby said shoes outwardly away from each other;
   second brake force applying means including an elongate lever pivotally connected adjacent one end thereof with one of said shoes adjacent said one extremity of the latter and extending therefrom in the general direction of the opposite extremity of said one shoe, strut means extending between and oppositely coupled with intermediate portions of the other of said shoes and said lever to provide a fulcrum for the latter intermediate its ends, and means operably coupled with said lever adjacent the opposite end thereof for applying a force to the latter to swing the same inwardly to rock said lever upon said fulcrum and move said one end of said lever and thereby said one extremity of said one shoe outwardly away from said other shoe; and
   a hole in said backing plate facing a part of said lever adjacent said opposite end of the latter;
the improvement of which brake comprises improved and reusable stop means for releasably holding said shoes in a standby, partially retracted position between the fully inwardly retracted position they would otherwise assume under the influence of said biasing means and their outwardly shifted braking position and for automatically causing said shoes to shift to said fully retracted position thereof to facilitate access to said linings for maintenance purposes when said stop means are placed in a releasing condition thereof, said improved stop means including:
   a housing mounted on said backing plate in adjacent but spaced relationship to said part of said lever and having a sleeve portion extending outwardly from said backing plate in a direction away from said part of said lever,
   said sleeve portion being provided with a cylindrical bore extending therethrough, communicating with said opening in said backing plate, having its inner extremity spaced from said part of said lever, and having its axis in alignment with said part of said lever;
   an elongate stop member of greater length than said bore having a generally cylindrical stretch of lesser diameter than said bore slideably and rotatably receivable within the latter for free rotation of said member relative to said sleeve portion and free axial movement of said stretch selectively inwardly into and through and outwardly out of said bore,
   said member having a holding position in which the inner extremity thereof is disposed inwardly of said inner extremity of said bore for engaging said part of said lever to hold the latter in said standby, partially retracted position thereof while an outer portion of said member is disposed outwardly of said backing plate and accessible for manipulation to move said member rotationally and axially relative to said housing; and
   cooperating, rotationally lockable and releasable, fastening means on said sleeve portion and said member for limiting rotation of said member relative to said housing as said member is moved toward said holding position thereof and for, selectively and in response to predetermined rotation of said member relative to said housing, alternatively locking said member in said housing in said holding position of said member for maintaining said shoes in their said standby, partially retracted position or releasing said member from said housing for permitting either outward retraction of said member axially of said bore away from said lever to cause said shoes to automatically shift into said fully retracted position thereof of reinsertion of said member and repositioning thereof in its said holding position within said housing.

2. The improvement as set forth in claim 1, wherein said cooperating fastening means on said sleeve portion and said member include:
   J-shaped slit means in said sleeve portion of said housing; and
   pin means extending generally radially outwardly from said stretch of said member for operative reception within said slit means of said housing and movement therealong.

3. The improvement of claim 2, wherein said stop means is provided with a compression spring means operably coupled with said backing plate and said stop member for yieldably biasing said member outwardly along said bore and away from said holding position of said member.

4. The improvement of claim 1, wherein said stop means is provided with
   a cup-like cover; and
   means for mounting said cover on a portion of said stop member outwardly external to said housing when said member is in its said housing position,
   said cover being configured and arranged for the open extremity thereof to engage said backing plate in circumscribing relationship to said sleeve portion of said housing, whereby said cover encloses and protects said housing and said inner stretch of said stop member from the entry of external foreign materials thereto when said member is in said housing and locked in said holding position thereof.

* * * * *